(No Model.)
G. W. PARKER.
AUTOMATIC CUT-OFF.
No. 316,386. Patented Apr. 21, 1885.
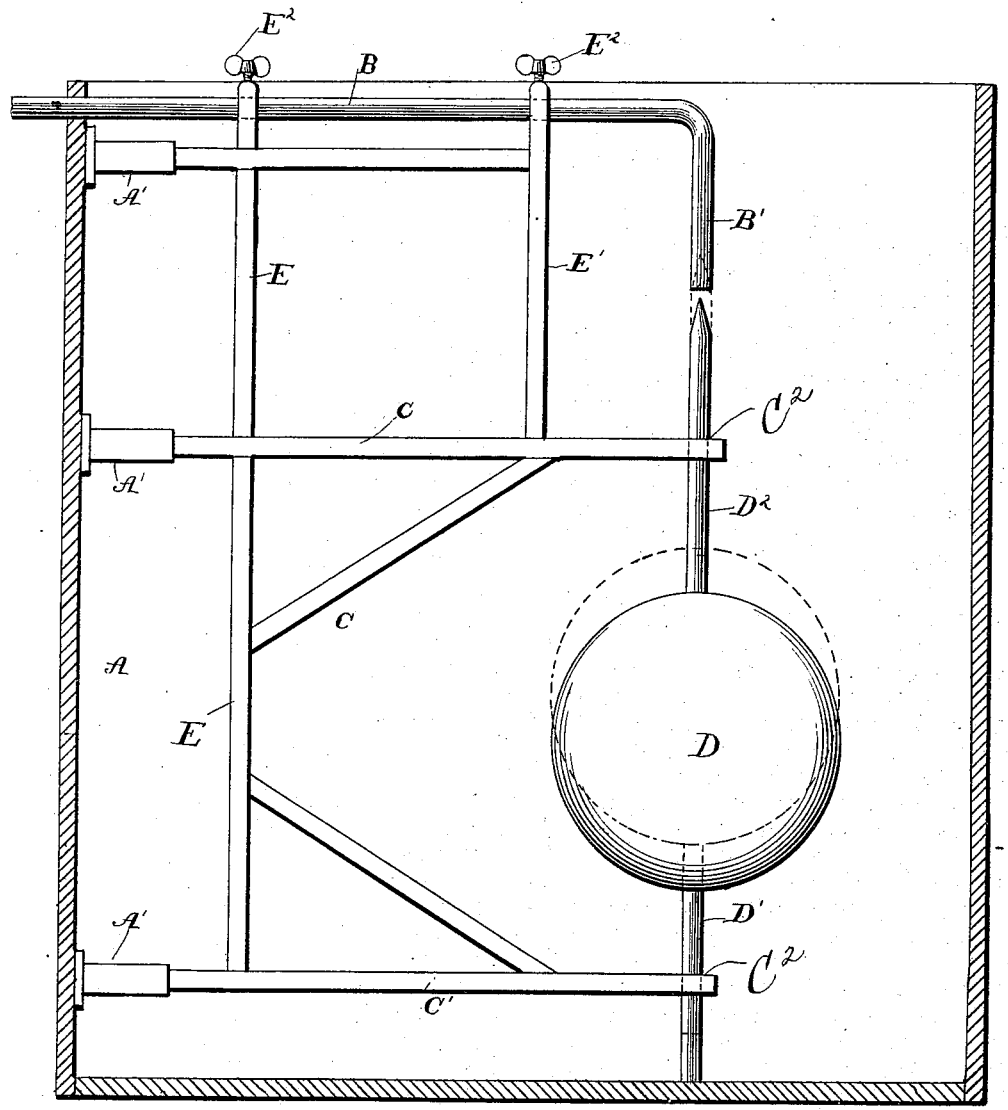
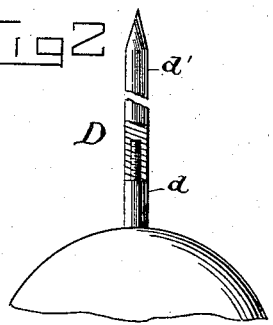

UNITED STATES PATENT OFFICE.

GEORGE W. PARKER, OF NEW RICHMOND, OHIO.

AUTOMATIC CUT-OFF.

SPECIFICATION forming part of Letters Patent No. 316,386, dated April 21, 1885.

Application filed August 7, 1884. (No model.)

*To all whom it may concern:*

Be it known that I, GEORGE W. PARKER, a citizen of the United States, residing at New Richmond, in the county of Clermont and State of Ohio, have invented certain new and useful Improvements in Water-Tank Automatic Cut-Offs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cisterns or water-tanks, and has for its object novel means whereby, when the desired quantity of water is drawn in the tank, the supply will be automatically cut off. It has for a further object convenient constructions whereby the valve or float may be moved so as to clear the supply-pipe when it is desired to overflow the tank.

It consists in certain novel constructions and combinations of parts, as will be hereinafter more fully described and claimed.

In the drawings, Figure 1 is a vertical section of a tank provided with my improvements. Fig. 2 is a detail view representing a preferred form of the valve.

The tank A may be of any desired form or size, and the supply-pipe B is extended across the upper side of the tank, and has its discharge end B' bent downward.

A suitable frame, C, is arranged in the tank, and preferably formed and supported as hereinafter more fully described. This frame is provided with horizontal bars C', extended one below the other, and both below the end B' of the pipe. Guide-openings $C^2$ are formed through both these bars C' in line with the end B', as shown.

The float D is made preferably in the globe shape shown, and has a rod, D', projected from it downward through the openings $C^2$ in the lower rod, C', and a rod, $D^2$, projected upward through the opening $C^2$ in the upper rod, C', as will be understood from Fig. 1. The rod $D^2$ is the valve, and has its extremity gradually tapered to a needle-point, so that it will fit snugly the mouth of the pipe B', and yet present practically no resisting-surface to the force of the water as the valve is being gradually forced to its seat by the rising of the water in the tank, and thus all lateral force on the valve is avoided. It will be seen that when the water flowing from the supply-pipe fills the tank to a certain point the float D will be raised by the water and cause the valve-rod $D^2$ to enter the mouth of and close the discharge-pipe, as indicated in dotted lines, Fig. 1.

Where it is desired to fill the tank at one time to one and at another time to another point, I employ the construction illustrated in Fig. 2. This consists in making the valve-rod in two sections, $d$ $d'$, the part $d$ being projected from the float, and having its end screw-threaded and the part or point $d'$ fitted to turn thereon. By using points of different lengths the tank may be filled to different heights before the valve will close the pipe.

The framing C is preferably formed with the vertical rod E, to which the rods C' are secured. These rods, it will be seen, extend beyond the rod E and into sockets A', secured on the side of the tank. The upper end of rod E is sleeved and movable on the pipe B, and a short rod, E', has its lower end secured to the upper bar, C', and its upper end sleeved and movable on the pin B, as shown.

By set-screws $E^2$, turned through rods E E' against pipe B, the frame may be secured at any point to which it may be moved laterally. By them the frame may be secured in position, as shown, so the valve-rod when elevated will close the mouth of the supply-pipes; or, if it be desired to overflow the tank, the frame may be moved laterally to bring the valve out of line with the pipe B', as will be understood.

In the arrangements shown the sockets A' act to retain the frame in line with the pipe, in order that the valve may be accurately and readily adjusted into line with the pipe when desired.

Having thus described my invention, what I claim, and desire to secure by Letters Patent, is—

1. The combination of the supply-pipe having a pendent arm or end, the float held in proper guides and movable vertically below the said end, and a valve-rod projected upward from said float and made in sections, whereby the parts of same may be interchanged with ones of different length, and the supply be automatically shut off when the tank has been filled to different points, substantially as set forth.

2. The combination of the tank, the supply-pipe, the float-supporting frame arranged in the tank and adjustable laterally, substantially as described, and the float provided with a valve-rod, and supported and movable with said frame, substantially as and for the purposes set forth.

In testimony whereof I affix my signature in presence of two witnesses.

GEORGE W. PARKER.

Witnesses:
    FRANK DAVIS,
    WILLIAM WEIR.